United States Patent
Kim et al.

(10) Patent No.: US 10,245,658 B2
(45) Date of Patent: Apr. 2, 2019

(54) CUTTING DEVICE AND CHAMFERING MACHINE COMPRISING THE SAME

(71) Applicant: LG CHEM, LTD., Seoul (KR)

(72) Inventors: YoungTae Kim, Daejeon (KR); YuShik Hong, Daejeon (KR); SeulKi Park, Daejeon (KR); DoWon Yang, Daejeon (KR); YeHoon Im, Daejeon (KR)

(73) Assignee: LG Chem, Ltd., Seoul (KR)

( * ) Notice: Subject to any disclaimer, the term of this patent is extended or adjusted under 35 U.S.C. 154(b) by 103 days.

(21) Appl. No.: 15/463,996

(22) Filed: Mar. 20, 2017

(65) Prior Publication Data
US 2017/0282260 A1 Oct. 5, 2017

(30) Foreign Application Priority Data
Mar. 31, 2016 (KR) .................. 10-2016-0038800

(51) Int. Cl.
*B23C 3/12* (2006.01)
*B23C 5/20* (2006.01)

(52) U.S. Cl.
CPC .................. *B23C 3/12* (2013.01); *B23C 5/20* (2013.01); *B23C 2200/083* (2013.01); *B23C 2200/203* (2013.01); *B23C 2200/28* (2013.01); *B23C 2210/084* (2013.01)

(58) Field of Classification Search
CPC . Y10T 409/305208; Y10T 409/305264; B23C 3/002; B23C 3/005; B23C 3/12; B23C 5/20; B23C 5/202; B23C 2200/083; B23C 2200/203; B23C 2200/28
See application file for complete search history.

(56) References Cited

U.S. PATENT DOCUMENTS

| | | | | |
|---|---|---|---|---|
| 1,195,774 | A | * 8/1916 | Brown | B23C 5/2472 144/219 |
| 1,484,207 | A | * 2/1924 | Campbell | B23C 5/242 407/45 |
| 2,413,452 | A | * 12/1946 | Kaiser | B23C 5/242 407/36 |
| 2,495,091 | A | * 1/1950 | Bradley | B23C 5/242 407/36 |

(Continued)

FOREIGN PATENT DOCUMENTS

| | | |
|---|---|---|
| CN | 200948512 Y | 9/2007 |
| CN | 102574220 A | 7/2012 |
| EP | 0600220 A1 | 6/1994 |

*Primary Examiner* — Daniel Howell
*Assistant Examiner* — Yasir Diab
(74) *Attorney, Agent, or Firm* — Dentons US LLP (57) ABSTRACT

The present invention relates to a cutting device and a chamfering machine comprising the same, and according to one aspect of the present invention, a cutting device for use in a chamfering process of a film laminate is provided, in which the cutting device comprises a rotating wheel having a rotation center; and a cutting bite comprising a main body mounted on the rotating wheel and a cutting tip provided on the main body and provided to perform chamfering of the film laminate by rotating the rotating wheel, wherein the cutting bite is mounted on the rotating wheel such that the central axis of the cutting tip is inclined at a first angle with respect to the tangential direction of a rotation locus of the cutting bite formed by rotating the rotating wheel.

14 Claims, 8 Drawing Sheets

(56) References Cited

U.S. PATENT DOCUMENTS

| | | | | |
|---|---|---|---|---|
| 2,586,955 | A | * | 2/1952 | Kaiser .................... B23C 5/242 407/38 |
| 2,903,784 | A | * | 9/1959 | Billman ................ B23C 5/2472 407/38 |
| 3,131,458 | A | * | 5/1964 | James .................. A43D 37/005 12/17 R |
| 3,614,909 | A | * | 10/1971 | Rolf-Dieter ........ B23Q 17/2233 33/628 |
| 3,758,928 | A | * | 9/1973 | Blake ........................ B42C 5/04 407/1 |
| 3,828,409 | A | * | 8/1974 | Aspinwall ................. B42C 5/00 407/113 |
| 4,789,273 | A | * | 12/1988 | Wiacek ................ B23C 5/2213 407/34 |
| 4,827,995 | A | * | 5/1989 | Wilson ................. A01G 23/067 144/235 |
| 4,936,718 | A | * | 6/1990 | Proffitt ...................... B23C 5/22 407/36 |
| 6,056,484 | A | * | 5/2000 | Mitchell ............... B23C 5/2493 407/36 |
| 6,065,382 | A | | 5/2000 | Titz et al. |
| 9,597,738 | B2 | * | 3/2017 | Cheronneau .............. B23C 5/06 |
| 2002/0066352 | A1 | * | 6/2002 | Satran ....................... B23C 5/08 83/839 |
| 2007/0127992 | A1 | * | 6/2007 | Spichtinger ............. B23C 5/006 407/39 |

* cited by examiner

Transfer Direction

[Figure 5a]

Ref. Case

[Figure 5b]

Case #1
(10°)

[Figure 5c]

Case #2
(20°)

[Figure 5d]

Case #3
(35°)

CUTTING DEVICE AND CHAMFERING MACHINE COMPRISING THE SAME

This application claims the benefit of Korean Patent Application No. 10-2016-0038800, filed Mar. 31, 2016, the contents of which are incorporated herein by reference in their entirety for all purposes as if fully set forth below.

TECHNICAL FIELD

The present invention relates to a cutting device and a chamfering machine comprising the same and, more particularly, to a cutting device for chamfering a film laminate and a chamfering machine comprising the same.

BACKGROUND ART

A chamfering machine has been used to cut a film for display to a desired size.

Figure 1A:
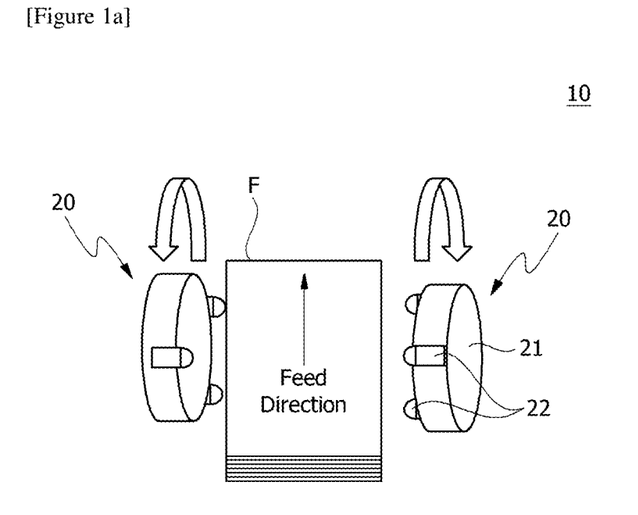
FIGS. 1a and 1b are conceptual diagrams for explaining a general chamfering process, respectively.
Figure 1B:
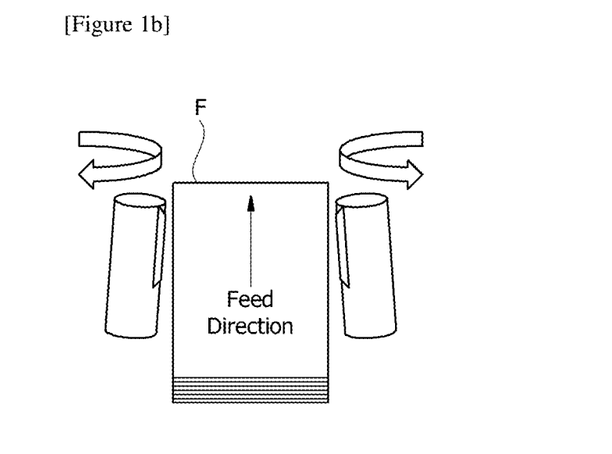

FIG. 1 is a conceptual diagram for explaining a general chamfering process.

Referring to FIGS. 1a and 1b, as a type of the chamfering machine, a face cut (F/C) type as shown in FIG. 1a and an end mill (E/D) type as shown in FIG. 1b have been used. At this time, in the case of the F/C type chamfering machine (10), cutting devices (20) are each provided on both sides of a film laminate (F) in a transfer direction, in which the cutting device (20) comprises a rotating wheel (21) and a plurality of cutting bites (22) mounted on the rotating wheel (21). Here, the chamfering method proceeds in such a manner that when the cutting bites rotate by rotating the rotating wheel (12), the film laminate (F) is cut.

Figure 2:
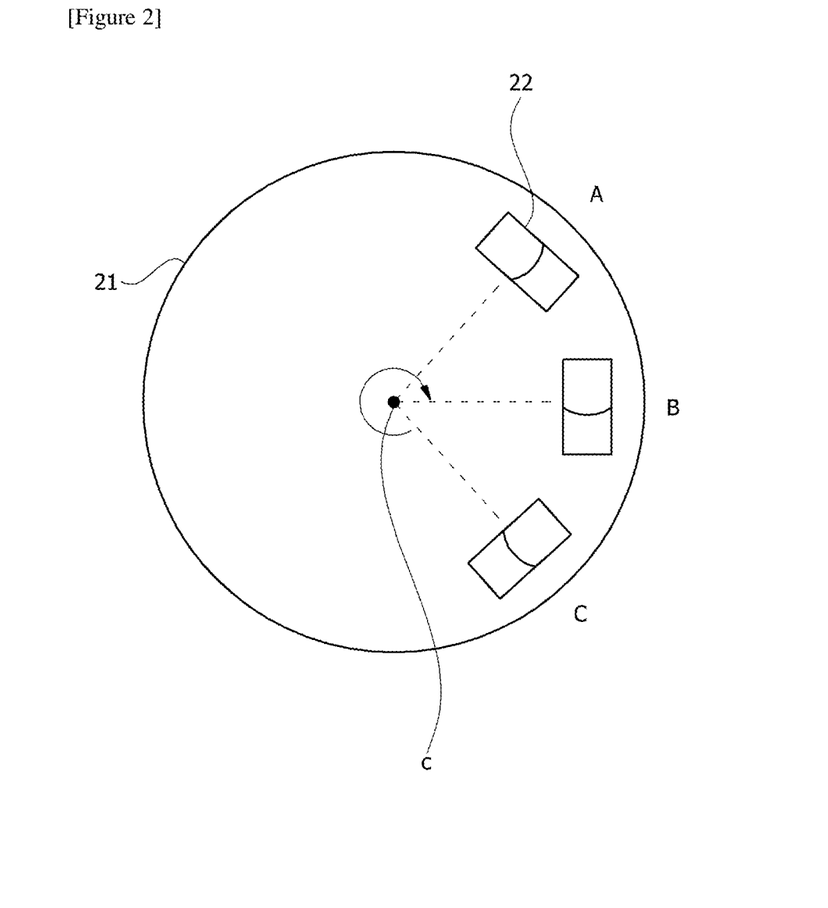
FIG. 2 is a conceptual diagram for explaining a chamfering method using the chamfering machine as shown in FIG. 1(a).

FIG. 2 is a conceptual diagram for explaining a chamfering method using the conventional chamfering machine (10) as shown in FIG. 1(a). Referring to FIG. 2, in the case of the cutting device (20) for the F/C chamfering machine conventionally used, there is a problem to cause microcracks on the film laminate (F) according to cutting positions (A, B, C) of the cutting bite (22) along a thickness direction of the film laminate (F). The transfer direction of the film laminate (F) is from right to left, based on FIG. 2, where at the points A and B, relatively severe cracks are generated on the film laminate (F), and it is understood that this is because the cutting direction and the transfer direction are opposite at the positions A and B, so that the interactive force increases.

DISCLOSURE

Technical Problem

It is a technical problem of the present invention to provide a cutting device capable of reducing stress acting on a film laminate regardless of a cutting position along a thickness direction of the film laminate during chamfering, and a chamfering machine comprising the same.

It is another technical problem of the present invention to provide a cutting device capable of preventing occurrence of cracks and defects in the film laminate during chamfering, and a chamfering machine comprising the same.

Technical Solution

To solve the above problems, according to one aspect of the present invention, a cutting device for use in a chamfering process of a film laminate is provided, in which the cutting device comprises a rotating wheel having a rotation center; and a cutting bite comprising a main body mounted on the rotating wheel and a cutting tip provided on the main body and provided to perform chamfering of the film laminate by rotating the rotating wheel.

Here, the cutting bite is mounted on the rotating wheel such that the central axis of the cutting tip is inclined at a first angle with respect to the tangential direction of a rotation locus of the cutting bite formed by rotating the rotating wheel.

In addition, the cutting bite is inclined so that the cutting tip is disposed closer to a rotation center of the rotating wheel than the case that the central axis of the cutting tip is parallel to the tangential direction.

Also, the first angle may be 20° to 35°.

Furthermore, the first angle may be 30°.

The cutting tip may be also provided such that a cutting line contacting with the film laminate along the rotation direction of the rotating wheel is formed as a curved line, but the central part has a convex shape protruded outward than both side edges.

Alternatively, the cutting tip may be provided such that a cutting line contacting with the film laminate along the rotation direction of the rotating wheel is formed as a curved line, but the central part has a concave shape recessed inward than both side edges.

Furthermore, the cutting tip may be provided such that the cutting line has a symmetrical shape with respect to the central axis.

In addition, according to another aspect of the present invention, a cutting device for use in a chamfering process of a film laminate is provided, in which the cutting device comprises a rotating wheel having a rotation center; and a plurality of cutting bites mounted on the rotating wheel, wherein the plurality of cutting bites are mounted apart along the circumferential direction of the rotating wheel, each cutting bite comprises a main body mounted on the rotating wheel and a cutting tip provided on an apical part of the main body and provided to perform chamfering by rotating the rotating wheel while maintaining a contact condition with the film laminate, and the cutting bite is mounted on the rotating wheel such that the central axis of the cutting tip is inclined at a first angle with respect to the tangential direction of a rotation locus of the cutting bite formed by rotating the rotating wheel.

Furthermore, the plurality of cutting bites may be mounted at the same angular interval along the circumferential direction of the rotating wheel.

In addition, at least two cutting bites may be each mounted at different distances from the rotation center along the radial direction of the rotating wheel.

Also, at least two cutting bites may be each mounted at the same distance from the rotation center along the radial direction of the rotating wheel.

Also, each cutting bite may be provided such that the cutting tip is exposed in the same direction based on the rotation direction of the rotating wheel.

Also, the cutting bite is inclined so that the cutting tip is disposed closer to the rotation center of the rotating wheel than the case that the central axis of the cutting tip is parallel to the tangential direction.

Also, the first angle may be 20° and 35°.

Also, the first angle may be 30°.

Furthermore, according to another aspect of the present invention, a chamfering machine is provided, which comprises a transfer unit for transferring a film laminate, the cutting devices disposed on both sides along a transfer direction of the transfer unit, respectively and a drive part for rotating the cutting devices.

Effects of Invention

As described above, the cutting device associated with one example of the present invention and the chamfering machine comprising the same have the following effects.

It is possible to reduce microcracks generated on the film laminate during chamfering and to reduce the maximum stress applied to the film laminate.

DETAILED DESCRIPTION OF INVENTION

Hereinafter, a cutting device according to one example of the present invention and a chamfering machine comprising the same will be described in detail with reference to the accompanied drawings.

In addition, the same or corresponding components regardless of reference numerals are given by the same or similar reference numerals, for which the redundant description will be omitted, and for convenience of explanation, the size and shape of each constituent member as shown in the drawings may be exaggerated or reduced.

Figure 3A:
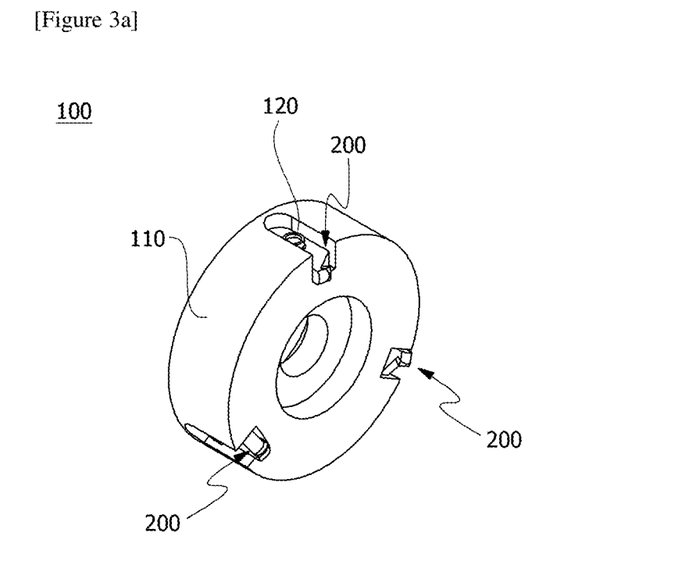
FIGS. 3a and 3b are perspective views of the cutting device associated with one example of the present invention, respectively.
Figure 3B:
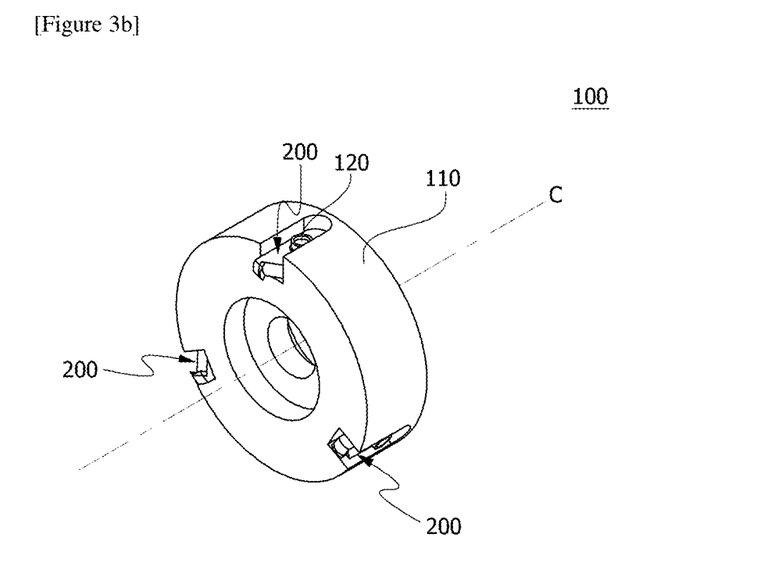
Figure 4:
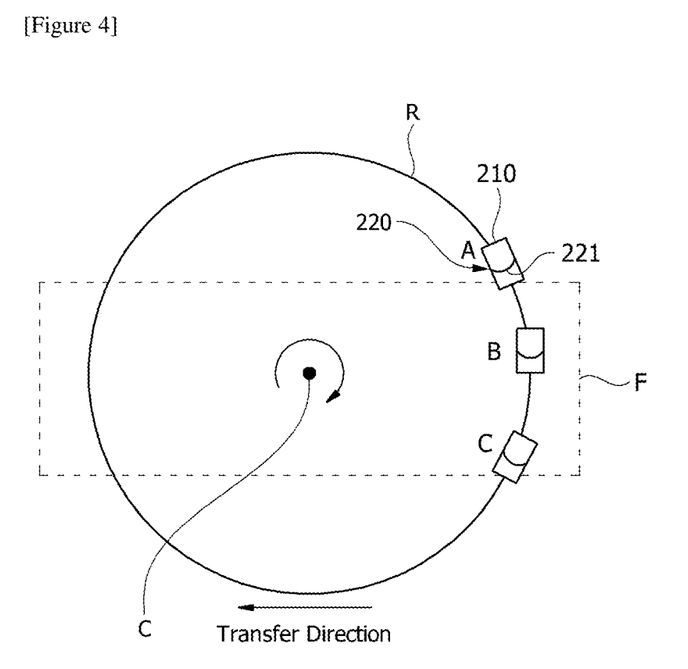
FIG. 4 is a plan view for explaining a rotation locus of the cutting bite as shown in FIGS. 3a and 3b.

FIGS. 3a and 3b are perspective views showing the cutting device (100) associated with one example of the present invention, respectively, and FIG. 4 is a plan view for explaining a rotation locus (R) of the cutting bite (200) as shown in FIGS. 3a and 3b.

Figure 5A:
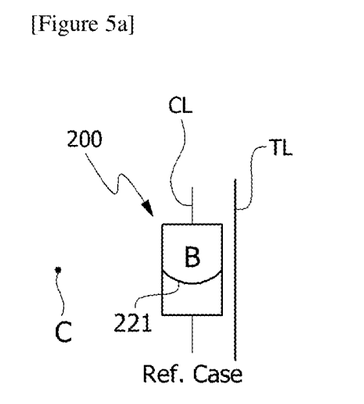
FIGS. 5a to 5d are conceptual diagrams for explaining an installation angle of the cutting bite as shown in FIG. 4, respectively.
Figure 5B:
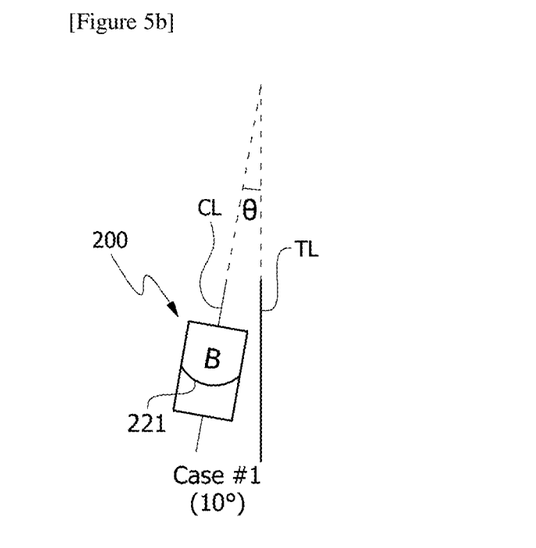
Figure 5C:
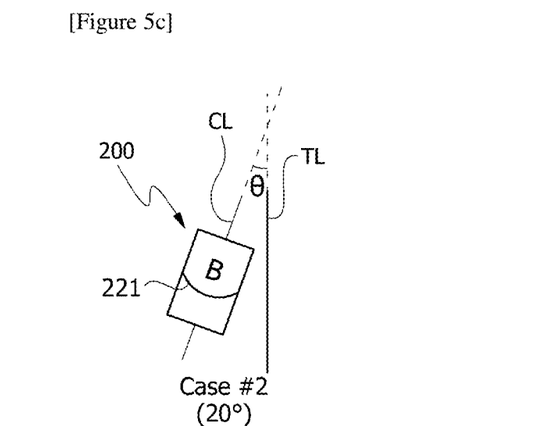
Figure 5D:
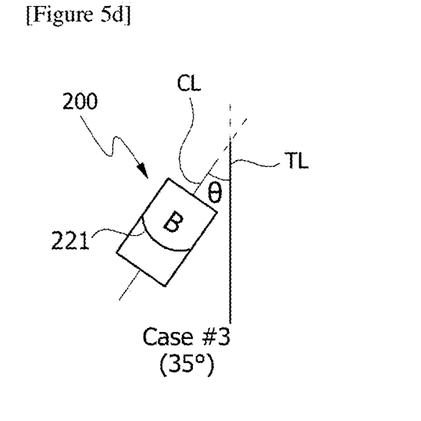
Figure 6:
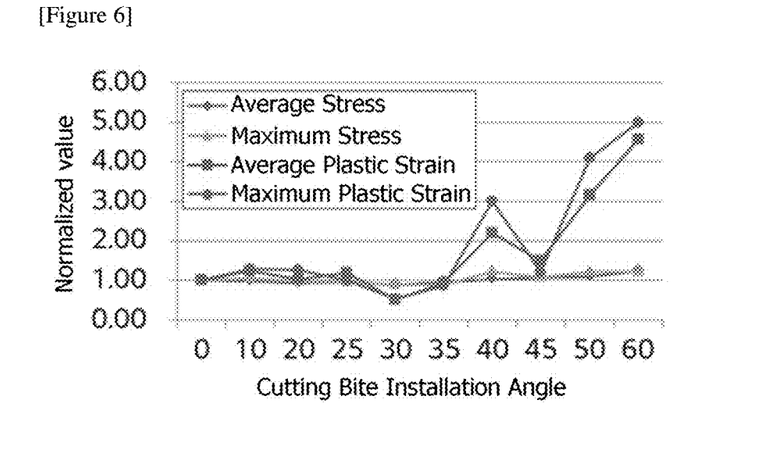
FIG. 6 is a graph for explaining effects according to the installation angle of the cutting bite.

In addition, FIGS. 5a to 5d are conceptual diagrams for explaining an installation angle of the cutting bite (200) as shown in FIG. 4, respectively, and FIG. 6 is a graph for explaining effects according to the installation angle of the cutting bite (200). In particular, FIG. 5 shows the installation angle (θ) of the cutting bite (200) at the position B of FIG. 4.

Figure 7:
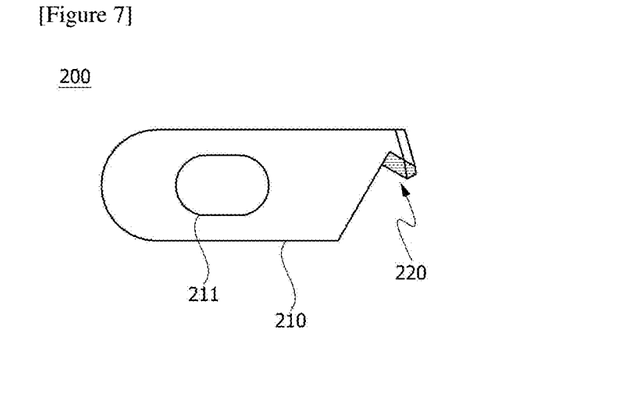
FIG. 7 is a side view of the cutting bite associated with the present invention.
Figure 8:
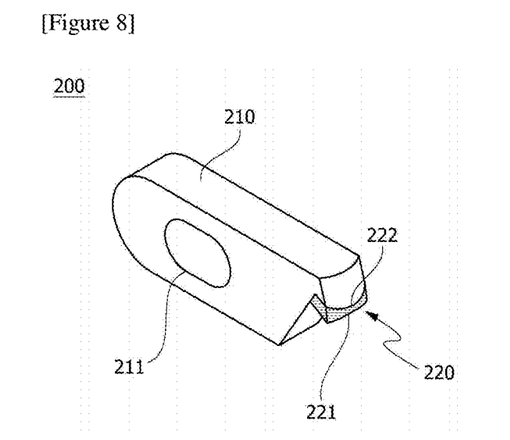
FIG. 8 is a perspective view of the cutting bite as shown in FIG. 7.
Figure 9A:
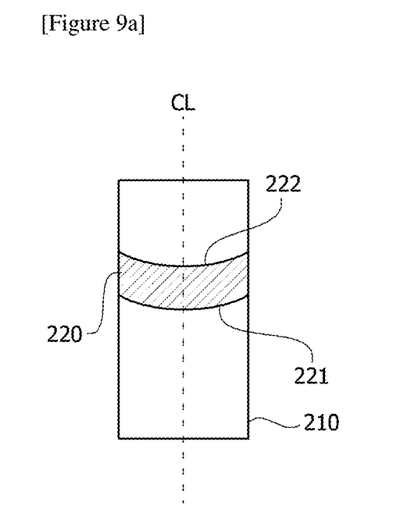
FIGS. 9a and 9b are front views of the cutting bite as shown in FIG. 7, respectively.
Figure 9B:
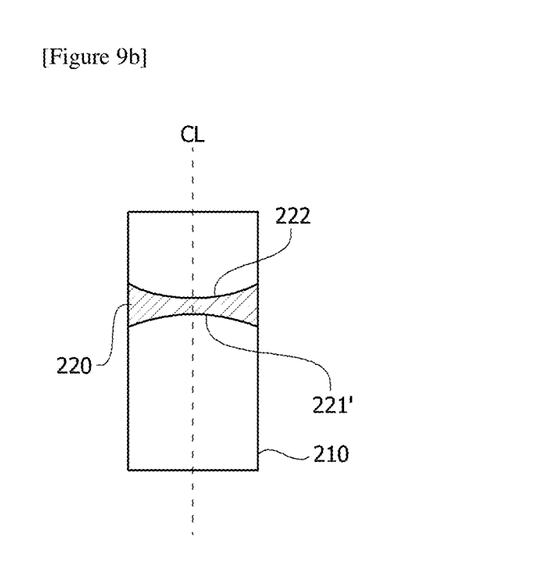

Furthermore, FIG. 7 is a side view of the cutting bite (200) associated with the present invention, FIG. 8 is a perspective view of the cutting bite (200) as shown in FIG. 7, and FIGS. 9a and 9b are front views of the cutting bite (200) as shown in FIG. 7, respectively.

The chamfering machine for a film laminate associated with one example of the present invention comprises a transfer unit for transferring the film laminate (F, see FIG. 1), cutting devices (100) disposed on both sides along the transfer direction of the transfer unit, respectively and a drive part for rotating the cutting devices (100). For example, the transfer unit may comprise a conveyor belt, and the drive part may comprise a motor.

The cutting device (100) associated with one example of the present invention is a cutting device (100) used in a chamfering process of a film laminate (F), in which the cutting device (100) comprises a rotating wheel (110) and a cutting bite (200). In addition, the chamfering machine comprises a pair of cutting devices (100), where the pair of rotating wheels (110) are provided to be opposite to both sides of the film laminate (F) in the feed direction (transfer direction). Also, the pair of rotating wheels (110) are arranged to perform the chamfering process on both sides (S) of the film laminate (F).

The rotation wheel (110) has a rotation center (C) and is rotated by a drive part based on the rotation center (C).

The cutting bite (200) comprises a main body (210) mounted on the rotating wheel (110) and a cutting tip (220) provided on the main body (210) and provided to perform chamfering of the film laminate (F) by rotating the rotating wheel (110). Specifically, the cutting tip (220) is provided at an apical part of the main body (210) to perform chamfering while maintaining a contact condition with the film laminate (F) by rotating the rotation wheel (110). At least some region of the main body (210) is inserted and fixed to the rotating wheel (110), the cutting tip (220) is disposed to be exposed to the outside and the cutting line (221) of the cutting tip (220) is provided to face the rotation direction of the rotating wheel (100).

The cutting device (100) may comprise a plurality of cutting bites (200). Specifically, the cutting device (100) includes a plurality of cutting bites (200) mounted apart on the rotating wheel (110) at a predetermined angle along the circumferential direction (rotation direction). Here, each cutting bite (200) may have the same structure. Here, each cutting bite (200) may be provided such that the cutting tip (220) is exposed in the same direction based on the rotation direction of the rotating wheel (110).

In addition, the plurality of cutting bites (200) may be mounted at the same angular intervals along the circumferential direction of the rotating wheel (110). Also, 3 to 6 cutting bites (200) may be mounted on the rotating wheel (110). At least two cutting bites (200) may also be mounted at different distances from the rotation center (C) along the radial direction of the rotating wheel (110), respectively. In this configuration, at least two cutting bites (200) may have rotation loci (R) of different turning radii by rotating the rotating wheel (110). At least two cutting bites (200) may also be mounted at the same distance from the rotation center (C) along the radial direction of the rotating wheel (110), respectively. In this configuration, at least two cutting bites (200) may have rotation loci (R) of different turning radii by rotating the rotating wheel (110).

Besides, the cutting bite (200) is mounted on the rotating wheel (110) through a fastening means. In particular, each cutting bite (200) is mounted such that the fastening means is inserted into the rotating wheel (110) along the radial direction of the rotating wheel (110), respectively. A mounting hole (211), on which the fastening means is mounted, is formed on the main body (210) of the cutting bite (200).

In addition, the cutting tip (220) may form cutting lines (221, 221') of curves contacting with the film laminate (F) along the rotation direction of the rotating wheel (110). For example, referring to FIG. 9a, the cutting tip (220) may be also provided so that the central part of the cutting line (221) has a convex shape protruded outward than both side edges. In this case, the cutting tip (220) may be provided such that based on an imaginary straight line connecting both side edges of the cutting line (221), the cutting line (221) as a whole is located outside the imaginary straight line. Referring to FIG. 9b, the cutting tip (220) may be also provided so that the central part of the cutting line (221') has a concave shape recessed inward than both side edges. In this case, the cutting tip (220) may be provided such that based on an imaginary straight line connecting both side edges of the cutting line (221'), the cutting line (221') as a whole is located inside the imaginary straight line. On the other hand, among the boundary lines between the main body (210) and the cutting tip (220), the mounting line (222) facing the cutting lines (221, 221') may be provided to have a convex curved shape.

In addition, the cutting tip (220) may be provided such that the cutting lines (221, 221') have a left-right symmetrical shape based on the central part. That is, the cutting tip (210) may be provided such that the cutting line has a symmetrical shape based on the central axis (CL). In addition, the cutting bite (220) may be provided such that the cutting line has a symmetrical shape based on the central axis (CL). Hereinafter, the central axis (CL) of the cutting line may be referred to as the central axis of the cutting tip and the central axis of the cutting bite.

Referring to FIGS. 4 to 6, the cutting bite (200) is mounted on the rotating wheel (110) such that the central axis (CL) of the cutting tip (220) is inclined at a first angle ($\theta$) with respect to the tangential direction (TL) of the rotation locus (R) of the cutting bite (200) formed by rotating the rotating wheel (110). In addition, when a plurality of cutting bites (200) are installed on the rotating wheel (110), each cutting bite (200) is mounted on the rotating wheel (110) such that the central axis (CL) of the cutting tip (220) is inclined at a first angle ($\theta$) with respect to the tangential direction (TL) of the rotation locus (R) of the cutting bite (200) formed by rotating the rotating wheel (110).

The cutting bite (200) is inclined so that the cutting tip (220) is disposed closer to the rotation center (C) of the rotating wheel (110) than the case that the central axis (CL) of the cutting tip (220) is parallel to the tangential direction (TL) (FIGS. 5b to 5d).

Also, the first angle ($\theta$) may be 20° to 35°, and the first angle ($\theta$) may be 30°.

On the other hand, when the cutting bite (200) is installed so that the central axis (CL) of the cutting tip (200) is parallel to the tangential direction (TL) as in the past, cracks, at the point A and the point B in FIG. 2, are generated in the film laminate (F) on chamfering. However, when the installation angle of the cutting bite (200) is inclined so that the cutting tip (220) is disposed closer to the rotation center (C) of the rotating wheel (110) than the case that the central axis (CL) of the cutting tip (220) is parallel to the tangential direction (TL) (FIG. 5a), the film laminate (F) may be obliquely cut even at the position A of FIG. 2, and thus the stress acting on the film laminate (F) may be reduced. Besides, if the inclined installation angle is too large, the cutting angle between the cutting bite and the film laminate becomes large, and the cutting property is reduced.

Referring to FIGS. 5a to 6, structural analyses are performed by varying the inclined angles of the cutting bite (200) as in FIGS. 5a to 5d, and the analysis results are as shown in FIG. 6. Particularly, as a result of comparing maximum plastic strains and stresses acting on the film laminate (F), it was confirmed to be appropriate when the first angle ($\theta$) is 20° to 35° on the basis of the maximum stress and it was confirmed to be the most excellent when the first angle ($\theta$) is 30°. In addition, it was confirmed that when the first angle ($\theta$) is applied to 30°, the percent defective is reduced by about 4.5%.

The preferred examples of the present invention as described above are disclosed for illustrative purposes, which can be modified, changed and added within thought and scope of the present invention by those skilled in the art and it will be considered that such modification, change and addition fall within the following claims.

DESCRIPTION OF REFERENCE NUMERALS

100: cutting device
110: rotating wheel
200: cutting bite
210: main body
211: mounting hole
220: cutting tip
221, 221': cutting line
222: mounting line

The invention claimed is:

1. A cutting device for use in a chamfering process of a film laminate, comprising
a rotating wheel having a rotation center; and
a cutting bite comprising a main body mounted on said rotating wheel and a cutting tip provided on said main body and provided to perform chamfering of the film laminate by rotating the rotating wheel,
wherein said cutting bite is mounted on the rotating wheel such that the central axis of said cutting tip is inclined at a first angle with respect to the tangential direction of a rotation locus of the cutting bite formed by rotating said rotating wheel, and
wherein the cutting tip is provided such that a cutting line contacting with the film laminate along the rotation direction of the rotating wheel is formed as a curved line, but a central part of the curved line has a concave shape recessed inward than both side edges.

2. The cutting device according to claim 1, wherein said cutting bite is inclined so that the cutting tip is disposed closer to the rotation center of the rotating wheel than the case that the central axis of the cutting tip is parallel to said tangential direction.

3. The cutting device according to claim 1, wherein said first angle is 20° to 35°.

4. The cutting device according to claim 3, wherein said first angle is 30°.

5. The cutting device according to claim 1, wherein the cutting tip is provided such that the cutting line has a symmetrical shape based on the central axis.

6. A cutting device for use in a chamfering process of a film laminate, comprising
a rotating wheel having a rotation center; and
a plurality of cutting bites mounted on said rotating wheel,
wherein the plurality of cutting bites are mounted apart along the circumferential direction of the rotating wheel,
each cutting bite comprises a main body mounted on the rotating wheel and a cutting tip provided on an apical part of said main body and provided to perform chamfering by rotating the rotating wheel while maintaining a contact condition with the film laminate, and
said cutting bite is mounted on the rotating wheel such that the central axis of said cutting tip is inclined at a first angle with respect to the tangential direction of a rotation locus of the cutting bite formed by rotating said rotating wheel, and wherein the cutting tip is provided such that a cutting line contacting with the film laminate along the rotation direction of the rotating wheel is formed as a curved line, but a central part of the curved line has a concave shape recessed inward than both side edges.

7. The cutting device according to claim 6, wherein the plurality of cutting bites are mounted at the same angular interval along the circumferential direction of the rotating wheel.

8. The cutting device according to claim 6, wherein at least two cutting bites are each mounted at different distances from the rotation center along the radial direction of the rotating wheel.

9. The cutting device according to claim 6, wherein at least two cutting bites are each mounted at the same distance from the rotation center along the radial direction of the rotating wheel.

10. The cutting device according to claim 6, wherein each cutting bite is provided such that the cutting tip is exposed in the same direction based on the rotation direction of the rotating wheel.

11. The cutting device according to claim 6, wherein said cutting bite is inclined so that the cutting tip is disposed closer to the rotation center of the rotating wheel than the case that the central axis of the cutting tip is parallel to said tangential direction.

12. The cutting device according to claim 6, wherein said first angle is 20° to 35°.

13. The cutting device according to claim 12, wherein said first angle is 30°.

14. A chamfering machine, comprising
a transfer unit for transferring a film laminate;
the cutting devices according to claim 1 disposed on both sides along a transfer direction of the transfer unit, respectively; and
a drive part for rotating said cutting devices.

* * * * *